United States Patent [19]

Lemoussu et al.

[11] 4,253,189

[45] Feb. 24, 1981

[54] CIRCUIT FOR RECOVERING THE CARRIER OF AN AMPLITUDE MODULATED SYNCHRONOUS DIGITAL SIGNAL

[75] Inventors: Michel Lemoussu, Saint Michel sur Orge; Claude Cardot, Gif-sur-Yvette, both of France

[73] Assignee: Compagnie Industrielle des Telecommunications CIT-Alcatel, Paris, France

[21] Appl. No.: 19,246

[22] Filed: Mar. 9, 1979

[51] Int. Cl.³ .......................................... H04L 27/22
[52] U.S. Cl. ..................................... 375/116; 375/96
[58] Field of Search .............. 325/321, 329, 330, 419; 329/50, 122, 123; 375/96, 116; 364/728

[56] References Cited

U.S. PATENT DOCUMENTS

| | | | |
|---|---|---|---|
| 3,806,815 | 4/1974 | Fletcher | 329/122 |
| 3,860,871 | 1/1975 | Hinoshita | 178/68 |
| 3,891,927 | 6/1975 | Filaferro | 329/50 |
| 3,919,653 | 11/1975 | Le Mouel | 329/122 |
| 3,944,938 | 3/1976 | Brouant | 329/50 |
| 3,984,778 | 10/1976 | Bhopale | 325/50 |
| 4,100,499 | 7/1978 | Monrolin | 329/50 |

OTHER PUBLICATIONS

W. F. Lawrence, "On the Use of . . . Demodulation," IEEE Trans. on Comm., Jan. 1976, pp. 46, 47.

Primary Examiner—Harold I. Pitts
Attorney, Agent, or Firm—Roland Plottel

[57] ABSTRACT

The present invention comes within the field of synchronous digital transmission. It relates to the recovering the carrier (which may be suppressed carrier) of an amplitude modulated synchronous digital signal. It provides a circuit which includes an oscillator (41) of adjustable frequency and phase to generate a local carrier, a demodulation circuit whose input(s) receives the local carrier (possibly phase shifted by $\pm\Psi$ (42,44,46,47) and the amplitude modulated synchronous digital signal e(t) and control means (48,49) which control the phase and the frequency of the oscillator from the signals delivered by the demodulation circuit and which comprise at least one sign coincidence autocorrelator. It advantageously applies to demodulating amplitude modulated single side band bipolar coded synchronous digital signals.

7 Claims, 6 Drawing Figures

CIRCUIT FOR RECOVERING THE CARRIER OF AN AMPLITUDE MODULATED SYNCHRONOUS DIGITAL SIGNAL

FIELD OF THE INVENTION

The present invention comes within the field of digital transmission. It relates to demodulating an amplitude modulated synchronous digital transmission signal and it relates more particularly to recovering the modulation carrier.

DISCUSSION OF THE PRIOR ART

Circuits for recovering the carrier of an amplitude modulated synchronous digital signal are known which, to recover the frequency and the phase of the carrier, use the carrier in the received signal when the carrier is transmitted, or simply a vestigial carrier or, even, particular pilot frequencies. Generally, such circuits do not allow very satisfactory phase recovery.

More recently, circuits have been proposed in which the phase of the carrier is recovered from certain characteristics of the received demodulated synchronous digital signal. Such recovery circuits generally include either, when there is a carrier frequency in the received signal, a filter for extracting the frequency, followed by a variable phase shifter controlled by a received demodulated synchronous digital signal, or—and this is more simple and does not require the carrier frequency in the received signal—a controllable oscillator phase locked to the received demodulated synchronous digital signal. In known carrier recovery circuits of this type, the synchronous digital signal is coded in bipolar code before being amplitude modulated for transmission. Some of these circuits use control means which tend to cancel the average value of the received demodulated signal of the signal between two consecutive level transitions in the same direction. Others use control means which tend to maximise a component at twice the symbol frequency of the synchronous digital signal, which is obtained by raising the received demodulated signal to the second power.

Preferred embodiments of the present invention provide a carrier recovery circuit in which, as in prior carrier recovery circuits, carreir recovery is effected from the received demodulated synchronous digital signals, but which, with respect to prior carrier recovery circuits, have improved characteristics due to a new type of control means which, further, are not limited to the case of synchronous digital signals coded in bipolar code.

SUMMARY OF THE INVENTION

In a first aspect of the present invention provides a carrier recovery circuit for recovering the carrier of an amplitude modulated synchronous digital signal, said circuit including:

a circuit for generating a local carrier, said circuit including means for adjusting the phase of the local carrier;

a demodulation circuit constituted by a linear modulator whose input receives the local carrier which may be phase shifted and the amplitude modulated synchronous digital signal and by a low-pass filter disposed following it; and a sign conicidence autocorrelator connected following the low-pass filter and which correlates the polarities of two versions of a signal supplied by the demodulation circuit, said versions being delayed with respect to each other by an integer multiple of a unit time interval of the synchronous digital signal in question and controlling said phase adjustment means.

In a second aspect the present invention provides a carrier recovery circuit for recovering the carrier of an amplitude modulated synchronous digital signal, said circuit including:

a circuit for generating a local carrier, said circuit including means for adjusting the phase of the local carrier;

a demodulation circuit which includes two linear modulators which receive firstly the amplitude modulated synchronous digital signal and secondly the local carrier, which is differently phase shifted for the two linear modulators, and two low-pass filters connected to the inputs, each following one of the modulators;

two sign coincidence correlators disposed at the input and each connected to the output of one of the low-pass filters and coupled at the output by a differential amplifier said correlators correlating the polarities of two versions of their input signal, said versions being delayed with respect to each other by an integer multiple of a unit time interval of the synchronous digital signal in question; and said differential amplifier which controls said phase adjusting means.

Several embodiments of the present invention are described by way of example, with reference to the accompanying drawings in which:

DETAILED DESCRIPTION OF THE INVENTION

The following part of the description relates only to a bipolar coded amplitude modulated single side band synchronous digital signal, but it should be observed that the invention applies to synchronous digital signals other than bipolar coded signals and transmitted in other modes of amplitude modulation.

Figure 1:
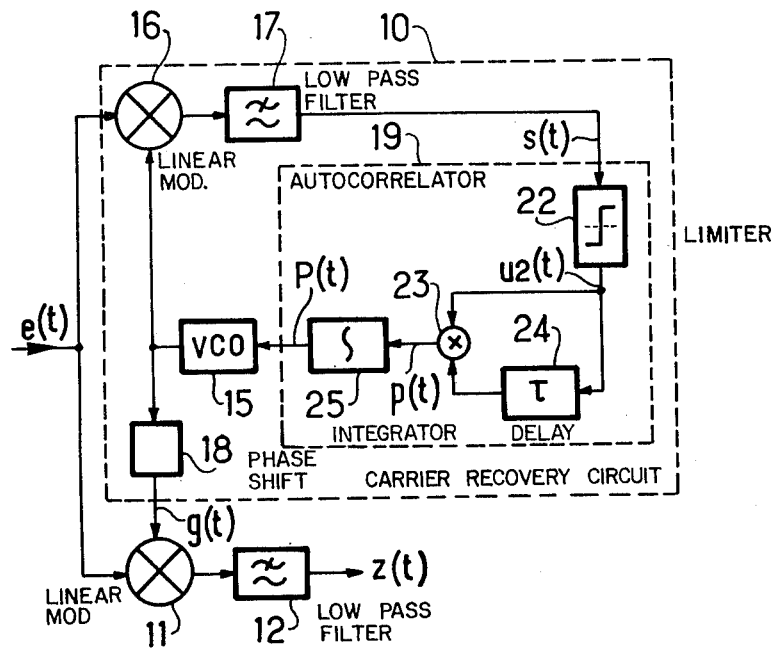
FIGS. 1, 2 and 3 are block diagrams of demodulators for receving a bipolar coded amplitude modulated single side band synchronous digital signal, said demodulators including a carrier recovery circuit in accordance with the invention.
Figure 2:
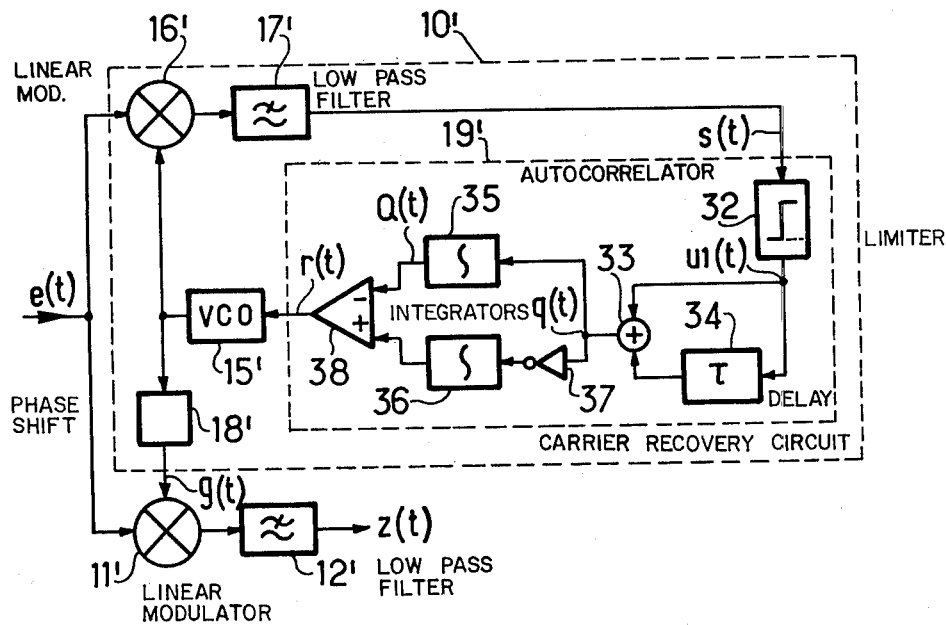

The demodulators illustrated in FIGS. 1 and 2 each include a carrier recovery circuit 10, 10' in accordance with the invention, associated with a linear modulator 11, 11' and a low-pass filter 12, 12' which actually demodulates the received signal.

Taking the received signal e(t) which results from single side band amplitude modulation of a cosΩt carrier by a synchronous digital signal y(t) which, in the case where it is considered that the retained side band is the lower side band, has the form:

$$e(t) = y(t) \cos \Omega t + \hat{y}(t) \sin \Omega t$$

$\hat{y}(t)$ being the Hilbert transform of the signal y(t).

Assuming that the linear modulator 11, 11' receives a local carrier g(t) whose frequency is the same as the transmission carrier and which is phase shifted by an angle $\phi$ in relation to the transmission carrier and that the low-pass filter 12, 12' eliminates the upper beat produced by the linear modulator 11, 11', there is obtained at the output a signal z(t) whose form is:

$$z(t) = \hat{y}(t) \cos \phi + y(t) \sin \phi \qquad (1)$$

The signal z(t) represents the transmission signal y(t) or its opposite $-y(t)$ if the angle $\phi$ is zero to within $K\pi$.

The carrier recovery circuits 10, 10' allow such a result. They each include:

an oscillator 15, 15' whose frequency and phase are adjustable;

a linear modulator 16, 16' whose first input receives the amplitude modulated single side band synchronous digital signal e(t) and whose second input receives the output signal of the oscillator 15, 15';

a low-pass filter 17, 17' connected to the output of the linear modulator 16, 16';

a fixed phase shifter 18, 18' connected to the output of the oscillator 15, 15', said phase shifter delivering the output signal of the recovery circuit; and a sign coincidence autocorrelator 19, 19' whose input is connected to the output of the low-pass filter 17, 17' and whose output is connected to an input which regulates the frequency and the phase of the oscillator 15, 15'.

The two carrier recovery circuits 10, 10' of the demodulators illustrated in FIGS. 1 and 2 differ in the structures of their sign coincidence autocorrelators 19 and 19' which deliver, however, the same output signal.

The sign coincidence autocorrelator 19 of the demodulator illustrated in FIG. 1 includes:

an absolute limiter 22;

a multiplier 23 with two inputs each connected to the output of the absolute limiter 22, one directly and the other via a delay circuit 24;

the delay circuit 24; and an integrator 25 connected to the output of the multiplier 23 and delivering the output signal of the autocorrelator.

An input signal s(t) applied to the input of the sign coincidence autocorrelator 19 is received by the absolute limiter 22 whose output delivers a logic signal $u_2(t)$. The signal is, by definition, a binary signal equal to $+1$ if s(t) is positive and $-1$ in the contrary case. The signal $u_2(t)$ is applied without delay to one input of the multiplier 23 and with a delay to the other. In response, the multiplier 23 delivers a signal p(t) applied to the integrator 25 which has an integration constant $t_1$ and an output signal P(t) which can be expressed by the equation:

$$P(t) = \frac{1}{t_1} \int_{t_0}^{t_0 + t_1} p(t) \, dt \qquad (p(t) = \pm 1)$$

The sign coincidence autocorrelator 19' of the demodulator illustrated in FIG. 2 includes:

an absolute limiter 32;

an adder 33 with two inputs each connected to the output of the absolute limiter 32, one directly and the other via a delay circuit 34;

the delay circuit 34; and two integrators 35 and 36 connected to the output of the adder 33, one directly, the other via a logic inverter circuit 37;

the logic inverter circuit 37; and a differential amplifier 38 whose inputs are connected to the outputs of the integrators 35 and 36 and which delivers the output signal of the autocorrelator.

An input signal s(t) applied to the input of the sign coincidence correlator 19' is received by the absolute limiter 32 which delivers in response an output signal $u_1(t)$ which is, by definition, at level 1 when the input signal s(t) is positive and at level 0 in the contrary case. The adder (33) performs the logic "exclusive OR" function. One of its inputs receives the signal $u_1(t)$ which comes from the absolute limiter 32 and its other input receives the same signal delayed by one period $\tau$ by the delay circuit 34. It delivers a signal q(t) related to the signal p(t) of the multiplier 23 (FIG. 1) by the equation:

$$p(t) = 1 - 2q(t) \qquad (2)$$

The integrator 35 has an integration time $t_1$ and delivers a signal Q(t) which can be expressed by the equation:

$$Q(t) = \frac{1}{t_1} \int_{t_0}^{t_0 + t_1} q(t) \, dt \qquad (q(t) = 0 \text{ or } 1)$$

The signal q(t) is also applied to the integrator 36 after having been complemented. The integrator 36 also has an integration period $t_1$. It delivers a signal $\overline{Q}(t)$ whose form is:

$$\overline{Q}(t) = \frac{1}{t_0} \int_{t_0}^{t_0 + t_1} \overline{q}(t) \, dt$$

The signals Q(t) and $\overline{Q}(t)$ are related to each other in the same manner as are the signals q(t) and $\overline{q}(t)$ by the equation:

$$\overline{Q}(t) = 1 - Q(t)$$

The output of the differential amplifier 38 supplies a signal r(t) equal to:

$$r(t) = \overline{Q}(t) - Q(t) = 1 - 2Q(t)$$

Since the signals P(t) and Q(t) are related to each other by the same equation (2) as p(t) and q(t), we also have:

$$P(t) = 1 - 2Q(t)$$

It is deduced therefrom that the sign coincidence correlators 19 and 19' illustrated in FIGS. 1 and 2 have the same output signal which will be designated exclusively as P(t) in the following part of the description.

The delay circuits 24 and 34 which process only binary signals can be formed by means of shift registers which have n stages and operate at a frequency of $n/\tau$, n being an integer chosen so as to obtain an acceptable compromise between the cost of the shift registers and the precision of the auto-correlators.

The integrators 25, 35 and 36 can be formed by means of low-pass filters with a time constant of $t_1$.

During experiments, it has been observed that the output signal P(t) of the sign coincidence autocorrelators 19, 19' varied as a function of the phase angle between the transmission carrier and the local carrier applied to the linear modulator 16, 16' when the delay $\tau$ of the delay circuits 24 and 34 was chosen to be equal to an integer multiple of the unit time interval T of the synchronous digital signal in question and that it was particularly suitable for locking the phase and the frequency of the oscillator 15, 15'.

To explain this property, it will be shown that the output signal P(t) of the sign coincidence autocorrelators 19, 19' is a function of the shift between the even numbered zeros and the odd numbered zeros of a signal applied to their input and having consecutive zeros initially spaced at unit intervals of time T. Then, by means of a simple example, it will be shown that a phase shift between the local carrier applied to the linear modulator 16, 16' and the transmission carrier produces a like shift between the zeros of the demodulated synchronous digital signal which comes from the low-pass filter 17.

Taking a signal s(t) whose consecutive even numbered zeros are shifted in relation to the odd numbered zeros and with an average time interval between two consecutive zeros equal to the unit time interval T, a signal of this type can be defined by the equation:

$$s(t) = A + \sin\pi \frac{t}{T}$$

A being a constant of less than 1 in modulus, or alternatively taking:

$$A = \sin\phi$$

$$s(t) = \sin\Phi + \sin\pi \frac{t}{T} \qquad (3)$$

The signal $u_2(t)$ at the output of the absolute limiter 22. 12 is expressed as:

$$u_2(t) = sgn.s(t) = sgn.(\sin\Phi + \sin\pi \frac{t}{T})$$

The two signals applied to the multiplier 23 are therefore:

$$sgn.(\sin\Phi + \sin\pi \frac{t}{T}) \text{ and } sgn.(\sin\Phi + \sin\pi \frac{t-T}{T})$$

The output signal p(t) of the multiplier 23 is therefore:

$$p(t) = sgn.(\sin\Phi + \sin\pi \frac{t}{T}) \times sgn.(\sin\Phi + \sin\pi \frac{t-T}{T})$$

$$p(t) = sgn.(\cos\frac{2\pi t}{T} - \cos 2\Phi)$$

On examining the preceding expression, it will be seen that the parenthesis remains negative when $\phi$ is equal to $\pi$ except at isolated instants where it is zero. In all other cases, the parenthesis is positive for part of the time. Assuming that the integration constant $t_1$ is long in relation to the unit time interval T, it is deduced that the average value P(t) reaches its minimum value $-1$ only when the time intervals between the consecutive zeros of the signal s(t) are all equal to the unit time interval 7. It can be shown that the average value P(t) varies linearly from $-1$ to $+1$ when the difference between the even zeros and the odd zeros varies from 0 to $\pi/2$ and from $\pi$ to $\pi/2$.

Figure 4:
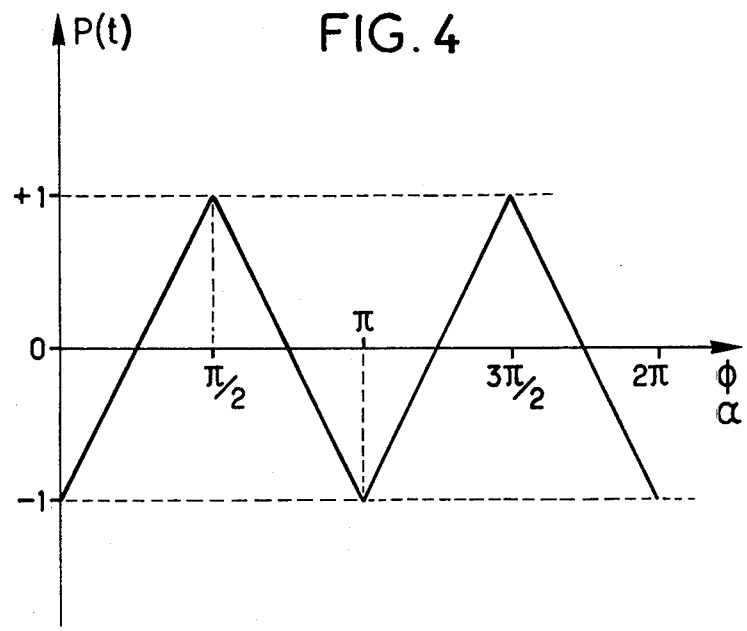
FIGS. 4, 5 and 6 are graphs which illustrate the characteristics of the demodulators illustrated in FIGS. 1, 2 and 3.

FIG. 4 is a graph which shows the variations of the average value P(t) as a function of the difference. It is triangular in shape with a period of $\pi$.

The shift $\phi$ actually represents a phase difference $\alpha$ between the transmission carrier and the local carrier applied to the linear modulator 16, 16'. This can be shown by calculation in the simplified case where the distortion of the transmission channel is disregarded and where it is assumed that the transmission signal is an isolated pulse with a rectangular spectrum whose width is ½ T, T being the unit time interval of the synchronous digital signal in question.

As has previously been seen, the received signal e(t) which results from a carrier cos $\Omega$t single side band amplitude modulated with a synchronous digital signal has the form:

$$e(t) = y(t) \cos \Omega t + \hat{y}(t) \sin \Omega t$$

$\hat{y}(t)$ being the Hilbert transform of the signal y(t):

$$\hat{y}(t) = \int_{-\infty}^{+\infty} \frac{y(\tau)}{t-\tau} d\tau$$

and e(t) being the lower side band.

Assuming that the linear modulator 16, 16' receives a local carrier whose frequency is the same as the transmission carrier but dephased in relation thereto by an angle $\alpha$ and assuming that the low-pass filter 17, 17' eliminates the upper beat produced by the linear modulator 16, 16', the form of the signal s(t) is:

$$s(t) = y(t) \cos \alpha + \hat{y}(t) \sin \alpha$$

Resuming the case in which the signal y(t) is an isolated pulse with a rectangular spectrum whose width is ½ T:

$$y(t) = K_1 \frac{\sin\pi \frac{t}{T}}{t} \qquad K_1 \text{ constant}$$

we have $$\hat{y}(t) = K_1 \frac{1 - \cos\pi \frac{t}{T}}{t}$$

The form of the signal s(t) is $$s(t) = K_1 \frac{\sin(\frac{\pi t}{T} - \alpha) + \sin\alpha}{t}$$

Except for the time origins, the function has the same sequence of zeros as the function s(t) (equation 3) adopted when examining the behaviour of the sign coincidence autocorrelators 19, 19'. Therefore it is deduced therefrom that the graph in FIG. 4 also represents the response P(t) of the autocorrelators 19, 19' as a function of the phase difference $\alpha$ between the transmission carrier and the local carrier supplied to the linear modulator 16, 16'.

Experiment and simulation on a computer show that the result still applies when the transmission signal is a synchronous digital signal whose unit time interval is T, constituted by a random succession of elementary pulses which have no particular form.

The fixed phase shifter 18, 18', connected at the output of the carrier recovery circuit 10, 10' avoids the difficulty of dependence on an extreme value of the signal P(t). If an adjustable phase and frequency oscillator 15, 15' is chosen which has the frequency of the transmission carrier when the signal P(t) is zero and which has phase variations proportional to the control signal and of opposite sign, the phase locking means will have a stable equilibrium point for a phase shift of $+\pi/4$ (to within $\pi$) of the oscillator 15, 15' in relation to the transmission carrier, and the fixed phase caused by the phase shifter 18, 18' will be chosen equal to $-\pi/4$ to within $\pi$.

Because of the uncertainty of $\pi$ on the phase of the output signal of the oscillator 15, 15' when the phase locking means is in a stable balanced position, the local carrier g(t) obtained at the output of the fixed phase deshifter 18, 18' will be either in phase or in phase opposition with the transmission carrier. As can be deduced from equation 1, this makes the demodulated signal z(t) which is available at the output of the low-pass filter 12, 12' equal either to the synchronous digital transmitted signal y(t) or to its opposite $-y(t)$. This ambiguity is not detrimental in some cases, particularly when the base band synchronous digital signal is in bipolar code. The ambiguity will be removed in other cases by suitable means which are available to the man in the art, for example by way of a non-limiting example by using, at the beginning of the transmission, a reference sequence known to the receiver. It will be necessary only to cause the reference sequence to have the correct sign either by a sign inverting device which operates at the output of the decoder or by rotating the phase of the demodulation carrier by $\pi$.

Figure 3:
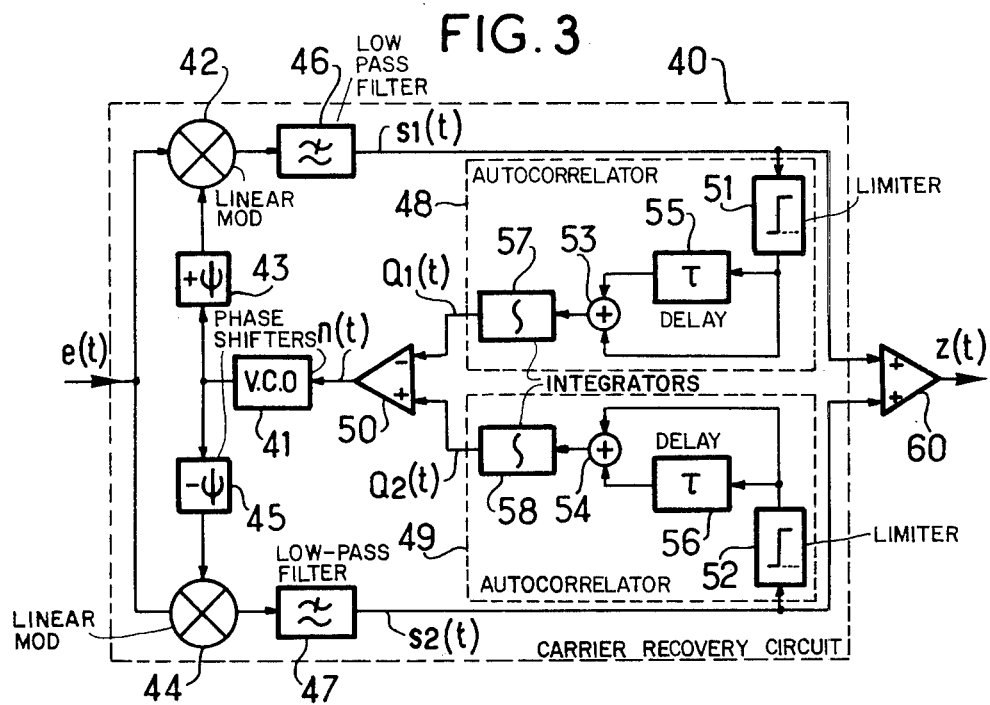

FIG. 3 is the block diagram of a demodulator which includes a preferred embodiment of the carrier recovery circuit in accordance with the invention. The demodulator is also provided for an amplitude modulated single side band synchronous digital signal. It has an entirely symmetrical structure and includes a carrier recovery circuit 40 followed by an adder 60 which delivers the demodulated signal.

The carrier recovery circuit 40 has a symmetrical structure and includes:

an oscillator 41 of adjustable phase and frequency;

a first linear modulator 42, one of whose inputs receives the amplitude modulated single side band synchronous digital signal e(t) and another of whose inputs receives the output signal of the oscillator 41 previously phase shifted by a fixed angle $\Psi$ by a first fixed phase shifter 43;

the first fixed phase shifter 43 connected between the output of the oscillator 41 and an input of the first binary modulator 42;

a first low-pass filter 46 connected to the output of the first linear modulator 42, the output of said filter delivering a signal $s_1(t)$;

a second linear modulator 44 one of whose inputs receives the amplitude modulated signle side band synchronous digital signal e(t) and another of whose outputs receives the output signal of the oscillator 41 previously phased shifted by a fixed angle $-\Psi$ by a second fixed phase shifter 45;

the second fixed phase shifter 45 connected between the output of the oscillator 41 and an input of the second linear modulator 44, a second low-pass filter 47 connected to the output of the second linear modulator 44, the output of said filter delivering a signal $s_2(t)$;

a first sign coincidence autocorrelator 48 whose input is connected to the output of the first low-pass filter 46 and which supplies a signal $Q_1(t)$;

a second sign coincidence autocorrelator 49 whose input is connected to the output of the second low-pass filter 47 and which supplies a signal $Q_2(t)$; and a differential amplifier 50 connected by its inputs to the outputs of the first and second sign coincidence autocorrelators 48 and 49 and by its output to a frequency and phase control input for the oscillator 41.

The outputs of the first and second low-pass filters 46 and 47 are also connected to the inputs of the adder 60 which delivers the demodulated signal z(t).

The first and second sign coincidence autocorrelators 48 and 49 are identical and each includes:

an absolute limiter 51, 52 connected to its input, the output of said limiter delivering a logic signal whose level is $+1$ if its input signal is positive and 0 in the contrary case;

an "exclusive OR" logic gate 53, 54 with two inputs each connected to the output of the absolute limiter 51,52, one directly, the other via a delay circuit 55, 56;

said delay circuit 55, 56 introducing a delay $\tau$ equal to one unit time interval of the synchronous digital signal in question; and an integrator 57, 58 connected to the output of the "exclusive OR" logic gate 53, 54.

With the demodulator illustrated in FIG. 3, the input signal e(t) is correctly demodulated when the phase difference $\phi$ between the output signal of the oscillator 41 and the transmission carrier is zero. Indeed, as set forth hereinabove, the form of the signal e(t) which is, the result of the single side band amplitude modulation of a carrier $\cos\Omega t$ by a synchronous digital signal y(t) is, assuming that the lower side band is retained.

$$e(t)=y(t)\cos\Omega t+\hat{y}(t)\sin\Omega t$$

The first linear modulator 42 receives a local carrier whose form is:

$$\cos(\Omega t+\Psi+\phi)$$

The first low-pass filter 46 eliminates the upper beat frequency produced by the first linear modulator 42 and its output supplies a signal $s_1(t)$ whose form is:

$$s_1(t)=y(t)\cos(\phi+\Psi)+\hat{y}(t)\sin(\phi+\Psi)$$

The second linear modulator 44 receives a local carrier whose form is:

$$\cos(\Omega t-\Psi+\phi)$$

The second low-pass filter 47 eliminates the upper beat frequency produced by the second linear modulator 44 and its output supplies a signal $s_2(t)$ whose form is:

$$s_2(t)=y(t)\cos(\phi-\Psi)+\hat{y}(t)\sin(\phi-\Psi)$$

When there is zero phase difference between the output signal of the oscillator 41 and the transmission carrier, the signals $s_1(t)$ and $s_2(t)$ become:

$$s_1(t)=y(t)\cos\Psi+\hat{y}(t)\sin\Psi$$

$$s_2(t) = y(t)\cos\Psi + \hat{y}(t)\sin\Psi$$

The value of the signal delivered by the summing amplifier 60 is then:

$$2y(t)\cos\Psi = Ky(t)$$

and effectively represents the synchronous digital signal y(t) used for transmission.

The phase locking signal n(t) available at the output of the differential amplifier 50 is constituted, to within a multiplication constant, by the difference between the output signal $Q_2(t)$ of the second sign coincidence autocorrelator 49 and by the output signal $Q_1(t)$ of the first sign coincidence autocorrelator 48:

$$n(t) = K'(Q_2(t) - Q_1(t))$$

The sign coincidence autocorrelators 48 and 49 have a structure which closely resembles that of the sign coincidence autocorrelator 19' (FIG. 2) and deliver the same signal as the signal Q(t) which is available at the output of the integrator 35 of the sign coincidence autocorrelator 19'. The variation laws of the signals $Q_1(t)$ and $Q_2(t)$ as a function of the phase difference $\phi$ can therefore be deduced from those of the signal P(t) as a function of the phase angle $\alpha$, using the equation:

$$P(t) = 1 - 2Q(t)$$

and replacing the phase angle $\alpha$ by the phase angle $\phi + \Psi$ for $Q_1(t)$ and by the phase angle $\phi - \Psi$ for $Q_2(t)$.

Figure 5:
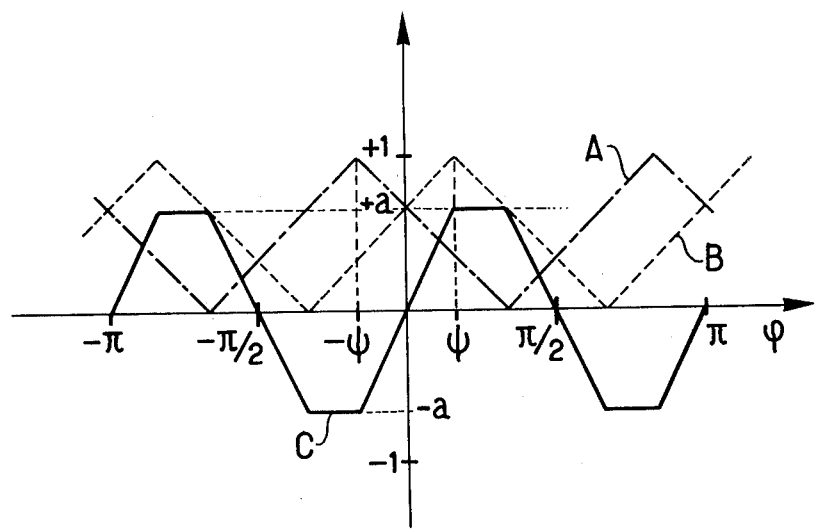

FIG. 5 is a set of graphs which represent the variations of the signals $Q_1(t)$, $Q_2(t)$ as a function of the phase angle $\phi$ and for any phase angle $\Psi$. Curve A represents the signal $Q_1(t)$, curve B represents the signal $Q_2(t)$ and curve C represents the signal $Q_2(t) - Q_1(t)$. Curves A and B vary between levels 0 and 1 and have identical triangular shapes. Their period is $\pi$, the periods being shifted in relation to one another by an angle $2\Psi$ and being symmetrical with one another in relation to the y-axis. With curve C representing the signal $Q_2(t) - Q_1(t)$ and consequently the control signal n(t) varies between two levels $-a$ and $+a$, a being less than or equal to 1 in modulus and being a function of $\Psi$: its period is $\pi$ and is symmetrical with respect to the origin.

The control signal n(t) is a function of the phase angle $\phi$ and has variations in the same direction when the angle $\phi$ varies within a given range centered on zero. It therefore makes it possible to keep a controlled oscillator at the position $\phi = 0$ provided the oscillator has a frequency equal to that of the transmission carrier for a zero control signal and has phase variations proportional to the control signal and of opposite sign.

Figure 6:
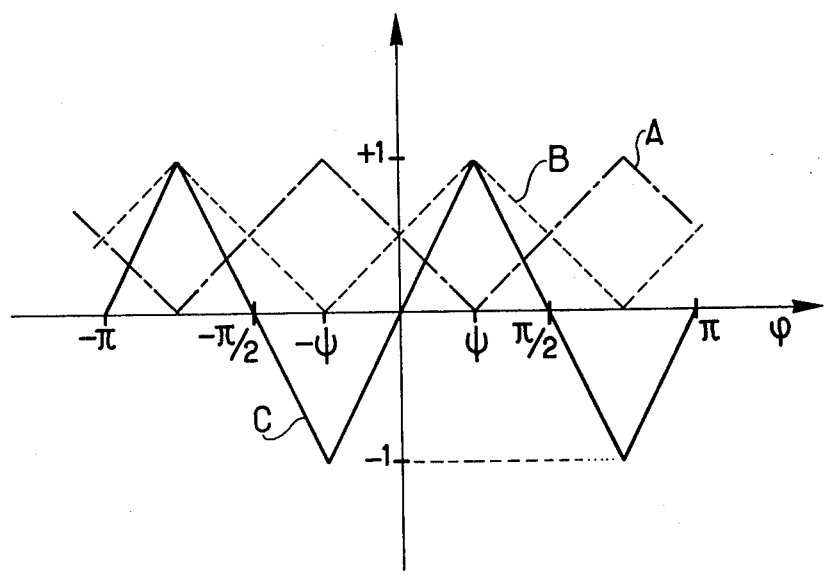

FIG. 6 shows the same graphs as FIG. 5 but for a particular value of $\Psi$ equal to $\pi/4$. For this value, curve C which represents the signal $Q_2(t) - Q_1(t)$ has a pure triangular shape and the control signal n(t) has a maximum capture range with a phase angle $\phi$ which may lie between $\pm \pi/4$.

Here again, there is an uncertainty of $\pi$ on the phase of the equilibrium point of the control means. It results in an uncertainty on the sign of the detected signal; this is not detrimental in the case where the base band synchronous digital signal used for transmission is in bipolar code and which, in any case, can be removed by the previously described methods.

The various linear modulators used can be balanced modulators, for example.

Without going beyond the scope of the invention, some dispositions can be modified or some means can be replaced by equivalent means. In particular, and although it is less advantageous in practice, a filter for extracting a component or else an oscillator locked on said component, followed by a variable phase shifter controlled by the particular control means of the invention could be used to generate the local carrier when the component contained in the received signal is at the carrier frequency.

We claim:

1. A carrier recovery circuit for recovering the carrier of an amplitude-modulated, synchronous digital signal, said circuit comprising:
   (a) means for generating a local carrier signal including means for adjusting the phase thereof;
   (b) a demodulation circuit comprising a linear modulator having a first input to receive said local carrier signal and a second input to receive said amplitude-modulated, synchronous digital signal and a low-pass filter downstream of said linear modulator; and
   (c) a sign-coincidence autocorrelator downstream of said low-pass filter for correlating the polarities of two versions of the signal generated by said demodulation circuit, said versions being delayed with respect to one another by an integral multiple of a unit time interval of the synchronous digital signal, said autocorrelator being connected to and controlling said phase adjustment means.

2. A carrier recovery circuit according to claim 1, wherein said sign-coincidence autocorrelator comprises:
   (d) an absolute limiter circuit connected to the input of said recovery circuit, the output of said limiter comprising a binary signal whose level is +1 if the input signal thereto is positive and −1 in the contrary case;
   (e) a delay circuit for introducing a delay equal to an integral multiple of a unit time interval;
   (f) a multiplier having two inputs, each connected to the output of said absolute limiter, one directly, the other via said delay circuit; and
   (g) an integrator, connected to the output of said multiplier, for generating the output signal of said autocorrelator.

3. A carrier recovery circuit according to claim 1, wherein said sign-coincidence autocorrelator comprises:
   (h) an absolute limiter circuit connected to the input of said recovery circuit, the output of said limiter comprising a logic signal whose level is +1 if the input signal thereto is positive and 0 in the contrary case;
   (i) a delay circuit for introducing a delay equal to an integral multiple of a unit time interval;
   (j) an "exclusive-OR" logic gate having two inputs each connected to the output of the absolute limiter, one directly, the other via said delay circuit;
   (k) a logic inverter circuit;
   (l) first and second integrators both connected to the output of said "exclusive-OR" logic gate, one directly, the other via said logic inverter circuit; and (m) a differential amplifier having its inverting and non-inverting inputs connected to the outputs of said first and second integrators, respectively, delivering the output signal of said autocorrelator.

4. A carrier recovery circuit for recoving the carrier of an amplitude-modulated, synchronous digital signal, said circuit comprising:
 (a) means for generating a local carrier signal, including means for adjusting the phase thereof;
 (b) a demodulation circuit comprising first and second linear modulator each of which receive on a first input the amplitude-modulated, synchronous digital signal and on a second input, said local carrier, means for phase shifting by a different amount, the local carrier signal applied to a respective one of said linear modulators, and first and second low-pass filters respectively connected downstream of said first and second modulators;
 (c) a differential amplifier connected to and controlling said phase adjusting means; and
 (d) first and second sign-coincidence autocorrelators connected to the output of a respective one of said first and second low-pass filters and connected respectively to the inverting and non-inverting inputs of said differential amplifier, said correlators correlating the polarities of two versions of the input signal thereto, said versions being delayed with respect to one another by an integral multiple of a unit time interval of said synchronous digital signal.

5. A carrier recovery circuit according to claim 4, wherein said first and second sign-coincidence autocorrelators are identical and each comprise:
 (e) an absolute limiter circuit connected to the input of said recovery circuit, the output of said limiter comprising a logic signal whose level is +1 if the input signal thereto is positive and 0 in the contrary case;
 (f) a delay circuit for introducing a delay equal to an integral multiple of a unit time interval;
 (g) an "exclusive-OR" logic gate having two inputs each connected to the output of the absolute limiter, one directly, the other via said delay circuit; and
 (h) an integerator connector to the output of said "exclusive-OR" logic gate for generating the output signal.

6. A carrier recovery circuit according to claim 4, wherein said phase shifting means introduces fixed phase shifts which are equal and of opposite sign, said means being connected between said carrier signal generating means and said first and second linear modulators.

7. A carrier circuit according to claim 6, wherein said phase shifting means shifts the phase of the local carrier by $\pi/4$ for one linear modulator and by $-\pi/4$ for the other.

* * * * *